United States Patent [19]
Burris et al.

[11] Patent Number: 5,450,496
[45] Date of Patent: Sep. 12, 1995

[54] COMMUNICATIONS HEADSET HAVING A DETACHABLE RECEIVER CAPSULE AND CABLE PIVOT

[75] Inventors: Christine Burris, Santa Cruz; Phillip A. Gattey, Los Gatos; Joseph Vitug; Larry R. Linville, both of Santa Cruz, all of Calif.

[73] Assignee: ACS Communications, Inc., Scotts Valley, Calif.

[21] Appl. No.: 105,283

[22] Filed: Jul. 30, 1993

[51] Int. Cl.⁶ .............................................. H04R 25/00
[52] U.S. Cl. ..................................... 381/183; 381/187
[58] Field of Search ............... 381/183, 187, 25, 68.6, 381/68.7, 68.3, 68; 379/430; 181/128, 129, 135

[56] References Cited

U.S. PATENT DOCUMENTS

| | | | |
|---|---|---|---|
| 817,457 | 4/1906 | Turner | 381/187 |
| 1,587,643 | 6/1926 | Harman | 381/68.7 |
| 2,474,135 | 6/1949 | White | 381/187 |
| 3,440,365 | 4/1969 | Bryant et al. | 374/430 |
| 4,420,657 | 12/1983 | Larkin | 381/189 |
| 4,917,504 | 4/1990 | Scott et al. | 381/187 |
| 4,983,344 | 1/1990 | Trägardh et al. | 381/187 |
| 5,035,005 | 7/1991 | Hung | 381/187 |
| 5,117,464 | 5/1992 | Jones et al. | 381/187 |
| 5,210,792 | 5/1993 | Kajihara | 381/187 |
| 5,260,997 | 11/1993 | Gattey et al. | 379/430 |
| 5,298,692 | 3/1994 | Ikeda et al. | 381/69 |

FOREIGN PATENT DOCUMENTS

| | | | |
|---|---|---|---|
| 3332496 | 3/1985 | Germany | 381/183 |
| 0399145 | 2/1943 | Italy | 381/187 |
| 0286185 | 3/1928 | United Kingdom | 381/187 |

OTHER PUBLICATIONS

Stetomike HMT 808, Dec. 8, 1982.

Primary Examiner—Curtis Kuntz
Assistant Examiner—Huyen D. Le
Attorney, Agent, or Firm—Limbach & Limbach; Michael A. Stallman

[57] ABSTRACT

A communications headset is disclosed having a detachable receiver capsule rotatably and pivotally attached to a main body, and a cable pivot for allowing the headset connection cable to pivot with respect to the receiver capsule. This combination of features allows the headset to be configured for use on either ear, and allows the receiver capsule to be used in conjunction with a variety of main body assemblies. Stabilization of the headset on the wearer's head is also increased by the cable pivot. The pivoting action of the cable allows the cable to exert a uniform force (from its own weight and tension) on a centrally balanced point on the headset regardless of the forward inclination of the wearer's head, thereby greatly reducing the amount of unsettling force to the headset that typically accompanies movement of the wearer's head.

7 Claims, 9 Drawing Sheets

COMMUNICATIONS HEADSET HAVING A DETACHABLE RECEIVER CAPSULE AND CABLE PIVOT

BACKGROUND OF THE INVENTION

1. Field of the Invention

The present invention relates to communications headsets, in particular to improving stability and versatility of lightweight headsets used in conjunction with voice communications.

2. Discussion of the Prior Art

A typical prior art headset, designed for use with a telephone, has at least one receiver element for converting electrical signals from the phone into sound waves directed into a headset wearer's ear or ears. The headset also has a microphone, typically mounted on the end of a microphone boom adjacent the wearer's mouth, for converting the wearer's voice into electrical signals going to the communication system. A cable typically is used to connect the headset to an amplifier or directly to a communication system, such as a phone system.

Communications headsets for use with telephones are currently manufactured in a wide variety of configurations to accommodate different user preferences. For example, binaural headsets have a receiver for each ear, usually connected by a band over the top of the wearer's head, whereas monaural headsets have a single receiver worn over one ear. Monaural headsets can be secured by a band over the top of the head, or can be secured in a number of ways on or around just one ear. A few of these versions include headsets that balance on top of the hook over and behind the ear, wrap around the ear or a portion of it, clip onto the ear, or fit partially inside the ear. Headset models are also available for eyeglass wearers that leave the top and back of the ear unobstructed for eyeglass frames.

Some prior art headsets have an ear tube that is placed inside the ear canal for directing sound from the receiver into the ear, while others have the receiver located directly over the outside of the ear. Some headset configurations have a microphone located at the end of a boom while others have a hollow boom that directs the wearer's voice up to a microphone transducer located inside the main body of the headset. More recently, headsets have been developed which include a microphone which is mounted behind the ear that picks up the wearer's voice directly from the mastoid. Some newer headsets are cordless, and communicate with a phone through radio transmission. Many of the above headset models have separate configurations for wearing on the left or the right ear. Because all of these configurations each have their own advantages and drawbacks (such as reduced comfort, stability or convenience), it is unrealistic to have a "universal" headset that satisfies the needs and desires of all potential wearers. When a headset manufacturer produces a larger number of configurations, the consumer's cost tends to be higher. This is due to lost economies of scale, increased costs associated with stocking more headsets and parts, and headset customers having to buy multiple headsets instead of having employees share the use of a headset (such as employees on different shifts) or not being able to pass headsets along to future users.

Some styles of prior art headsets are capable of being worn on either ear, as shown in U.S. Pat. No. 4,917,504, for example. In the latter device, a receive housing is pivotally mounted (in a non-releasable fashion) to the main body of the headset. When the device is switched from one ear to the other, the receiver housing is rotated about the pivot connection. Although the receiver housing can be rotated more than half way around, it is not possible to configure the headset so that the same side of the housing is properly aligned with either ear. Consequently, in this approach, it is necessary that both sides of the receiver housing be provided with sound ports so sound will reach the user's ear regardless of which ear it is worn on. This reduces the privacy of the phone conversation because sound is always broadcast away from the wearer's ear as well as towards it.

Another disadvantage to prior art headsets is caused by the cable that connects the headset to the communications equipment. A headset is typically used instead of a standard telephone handset to free up the hands of the wearer and to allow him or her greater mobility. The headset needs to remain relatively secure on the wearer's head to maintain good acoustical coupling between the receiver element and the ear, and to maintain the proper positioning of the end of the microphone boom relative to the wearer's mouth. The cable on prior art headsets tends to upset the balance of the headset when the wearer tilts his or her head or moves around. This problem reduces the wearer's mobility and or decreases the performance and comfort of the headset.

SUMMARY OF THE INVENTION

Broadly stated, the present invention, to be described in greater detail below, is directed to a communications headset having a detachable receiver capsule and a cable that is pivotally connected to the receiver housing.

In accordance with one aspect of the present invention, a common detachable receiver capsule can be used interchangeably with a variety of headset bodies, thereby allowing multiple configurations and reducing cost by facilitating manufacture, stocking, repair and upgrading the headset to new or different models.

In accordance with another aspect of the present invention, a pivotable receiver capsule allows a single headset to be configured for use on either the left or the right ear without the disadvantage of having sound broadcast from both sides of the receiver capsule.

In accordance with yet another aspect of the present invention, a pivotable cable connection reduces the unbalancing effects of the cable, thereby providing a more stable and comfortable headset.

DETAILED DESCRIPTION OF THE PREFERRED EMBODIMENTS

The limitations of the detailed embodiments below are provided for example only, with the scope of the invention set forth by the appended claims. In the preferred and alternate embodiments which follow, and in the accompanying drawings, like reference numbers refer to similar structures.

Figure 1:
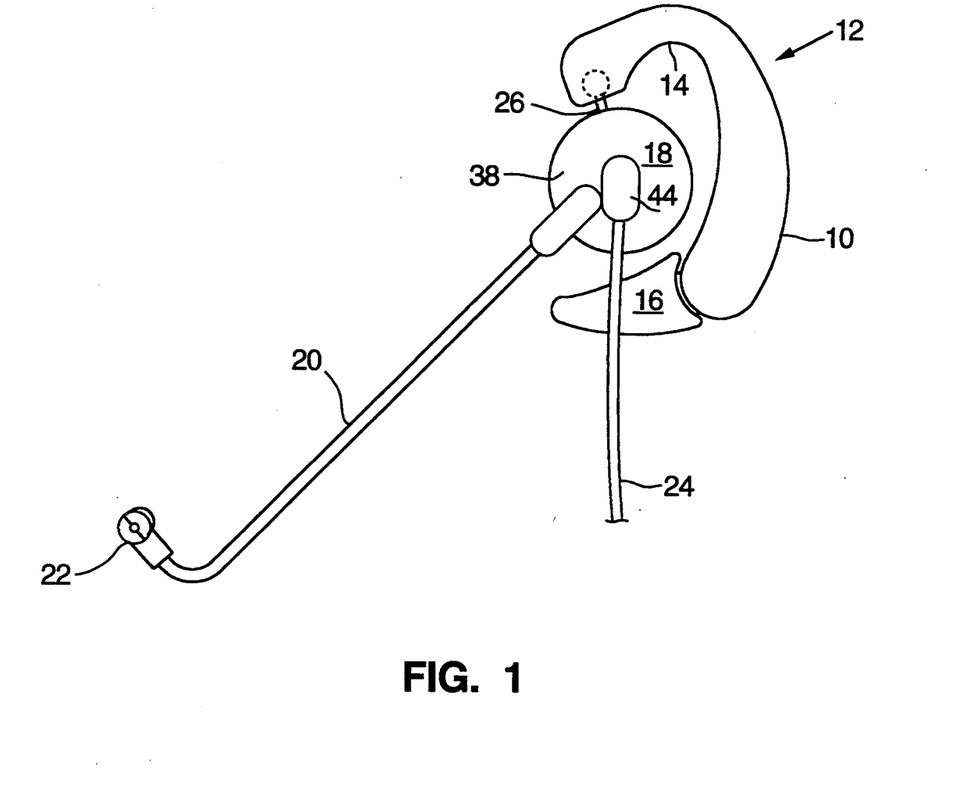
FIG. 1 is a side elevation view showing the preferred embodiment of the inventive headset configured for use on the left ear.

Referring to FIG. 1, the preferred embodiment of the present invention is shown configured for use on the left ear. The main body 10 of the inventive headset 12 has an arcuate surface 14 which is designed to fit over the top of the ear with the main body extending around the back of the ear. The main body 10 includes a stabilizing arm 16 which is rotated up against the bottom of the ear to stabilize the headset on the wearer's head. A detailed description of the stabilizing arm 16 and how it cooperates with the main body 10 to comfortably secure the headset 12 is disclosed in U.S. Pat. No. 5,260,997, issued Nov. 9, 1993, assigned to the assignee herein and incorporated by reference. Receiver capsule 18 located over the wearer's ear and produces sound which is directed into the ear. Microphone boom 20 is mounted to receiver capsule 18 and contains a microphone 22 at its distal end which is positioned near the wearer's mouth to pick up his or her voice. Internal wiring (not shown) connects the microphone 22 and receiver element 23 (FIG. 7B) inside the receiver capsule 18 to cable 24, which in turn connects the headset 12 to external communications equipment (not shown). In the embodiment shown in FIG. 1, there are no electronics located in the main body 10, but rather all the components and circuitry are located in the self contained receiver capsule 18 (and attached boom 20 and cable 24).

Figure 2:
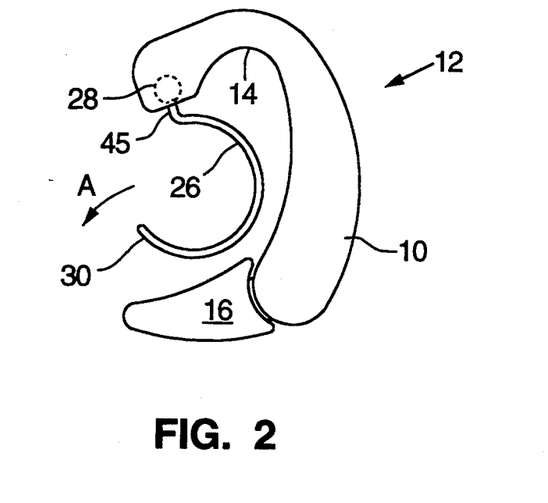
FIG. 2 is a side elevation view showing the preferred embodiment of the inventive headset with the receiver capsule removed.

Referring now to FIGS. 1 and 2, capsule holder 26 detachably connects receiver capsule 18 to the main body 10, and positions receiver capsule 18 so that it is directly over the auditory canal of the wearer's ear. FIG. 2 shows the headset 12 with the receiver capsule 18 removed. In the preferred embodiment, a ball and socket joint 28 is used to connect the capsule holder 26 to the main body. This pivot joint allows the receiver capsule 18 to rotate, pivot forward and back, and pivot in and away from the wearer's head, thereby comfortably conforming to the orientation of the outer surface of the ear.

Figure 6:
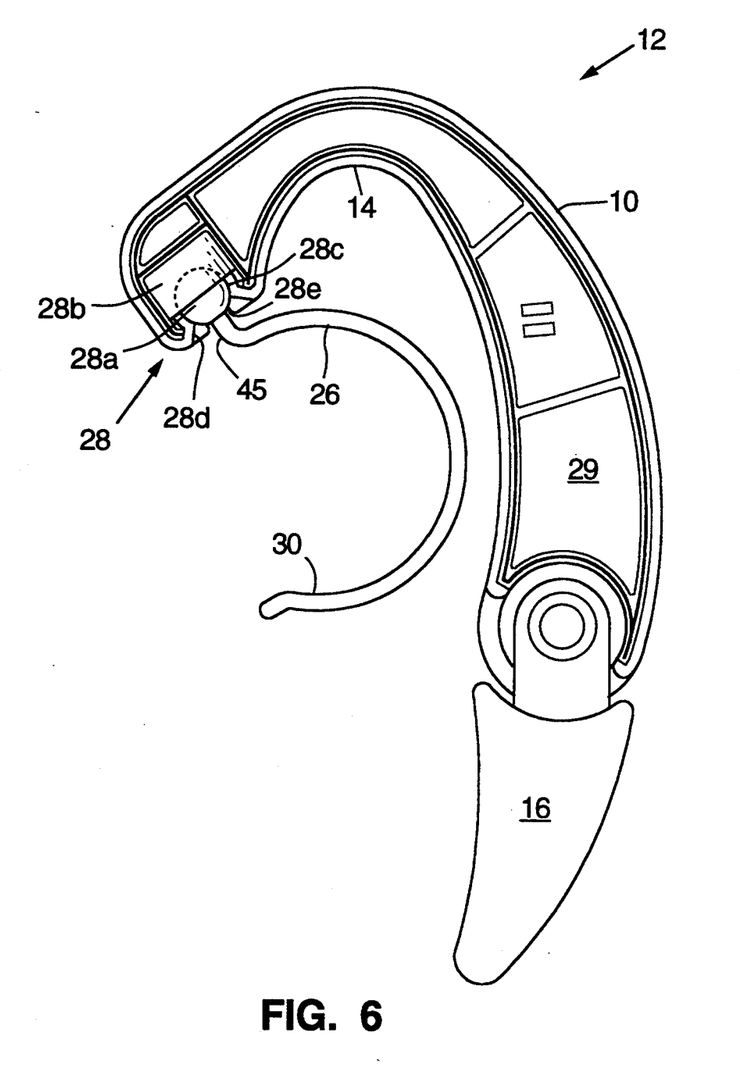
FIG. 6 is an enlarged side elevation view of one half of the main body, showing details of the ball joint.

FIG. 6 shows details of the ball and socket joint 28. In the preferred embodiment, the main body 10 is split along a vertical center plane with each half formed by a plastic shell 29, each shell 29 being substantially a mirror image of the other. A ball 28a is formed on the proximal end of the capsule holder 26. An elastomer friction element 28b, such as of Santoprene (registered trademark of Monsanto Company, St. Louis, Mo.), is used to form the top half of the socket to provide resistance to ball rotation in order to keep the receiver capsule 18 in place once it has been adjusted by the user. The bottom portion of the ball joint socket is provided by spherically shaped contact points 28c formed in plastic shell 29. Cone shaped relief 28d is provided beneath the ball and socket joint 28 to allow the capsule holder 26 and receiver capsule 18 to rotate 45 degrees in any direction away from the axis of the joint 28. Two notches 28e (only one shown) are also provided which permit the capsule holder 26 to rotate 90 degrees away from the axis in two positions, allowing the receiver capsule to be lifted completely away from either ear.

Capsule holder 26 is preferable made from a steel wire, so that the capsule holder 26 is able to flex outwardly, as shown by arrow A in FIG. 2, and then spring back when the receiver capsule 18 is attached or detached. Capsule holder 26 encircles the receiver capsule roughly two thirds around its circumference. This allows a sufficient length of wire at the distal end 30 of the capsule holder 26 to retain the receiver capsule 18, but not so great a length wire as to prevent the receiver capsule from being easily detached.

Figures 3A, 3B:
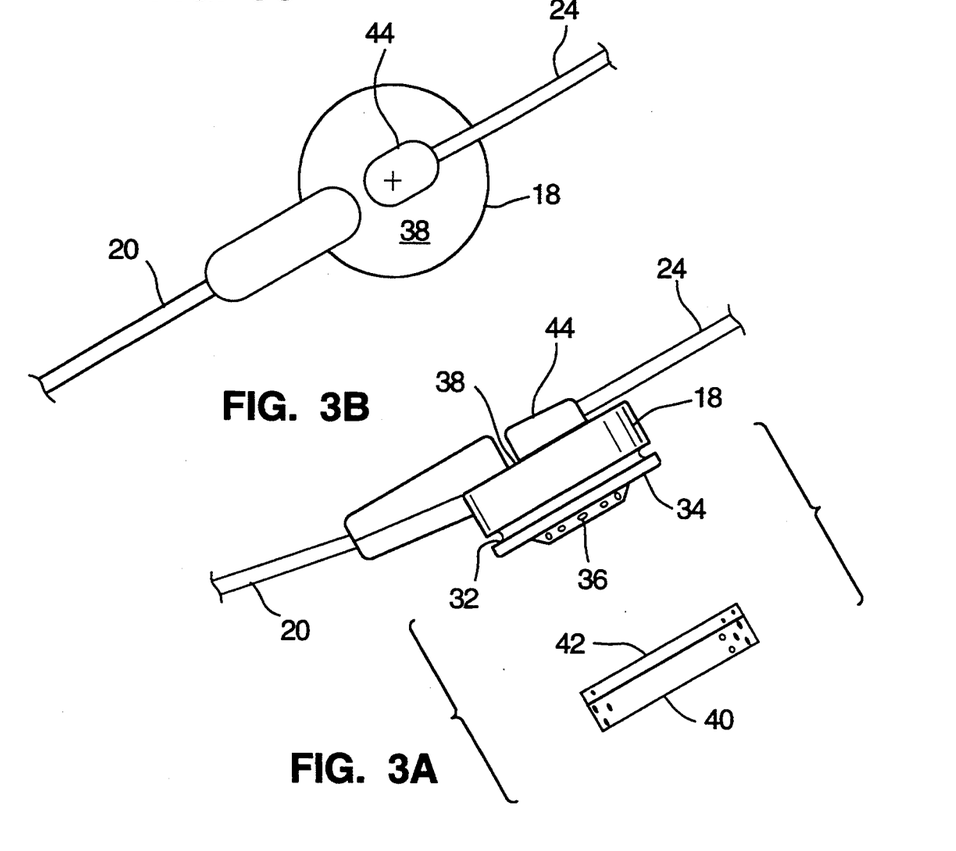
FIG. 3A is a partial side, exploded view of the receiver capsule assembly and detachable cushion.
FIG. 3B is a partial plan view of the receiver capsule assembly.

As seen in FIG. 3A, a continuous groove 32 is provided around the circumference of receiver capsule 18 for engaging the capsule holder 26. Because the groove is continuous, receiver capsule 18 can be rotated with respect to the capsule holder 26, but is held in the desired orientation by an inward spring force exerted by the capsule holder 26 and/or friction between the receiver capsule 18 and the capsule holder 26. Because the microphone boom 20 is attached to the receiver capsule 18, this adjustable rotation allows the microphone 22 to be properly oriented adjacent the wearer's mouth. Preferably, the boom 20 is also formed from a flexible material to permit further adjustments.

The inward surface 34 of capsule 18 contains a plurality of sound ports 36 to allow sound waves generated by the receiver element (not shown) to pass through the receiver capsule 18 into the auditory canal of the wearer's ear. The remaining surfaces of the receiver capsule, including the opposite outward surface 38, are sealed. This ensures that substantially all of the sound from the receiver element is directed into the wearer's ear and not out into the surrounding environment. A removable and replaceable foam cushion 40 with a frame 42 fits over the inward surface 34 to provide a more comfortable and sanitary fit for the wearer and a better acoustical seal with the ear. Also, foam cushion 40 can be replaced with a variety of different types and shapes of cushions, depending on the user's preference.

Figure 3C:
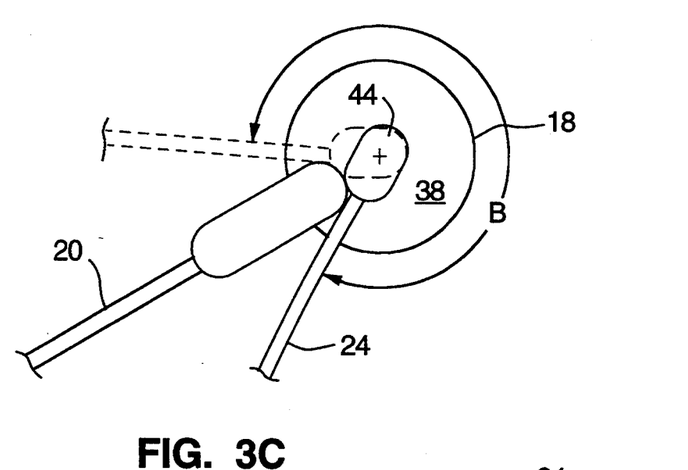
FIG. 3C is a partial plan view of the receiver capsule assembly showing the range of motion of the cable pivot.

Referring now to FIGS. 1, 3B and 3C, the inventive headset 10 further includes a cable pivot 44 between the cable 24 and the receiver capsule 18. Cable pivot 44 allows cable 24 to pivot about an axis perpendicular to the surface of the wearer's ear, as shown by arrow B in FIG. 3C. This pivoting action of the cable 24 allows the cable 24 to exert a uniform force (from its own weight and tension) on a centrally balanced point on the headset 12 regardless of the forward inclination of the wearer's head, thereby greatly reducing the amount of unsettling force to the headset 12 that typically accompanies movement of the wearer's head. In use, the cable tends to hang straight down and pivots as the wearer's head is tilted, so that it remains pointing down and exerts a force about a central fulcrum point. With this inventive feature, quick movements of the head are not accompanied with sharp yanks from the cable on the headset which might disrupt the performance of the headset and even require the headset to be repositioned on the wearer's head. The cable pivot 44 eliminates the torque that is exerted on conventional headsets when the cable extends back and exerts a downward force on an increased lever arm, thereby unbalancing the headset.

As shown in FIG. 3C, the rotation of the cable 24 is limited by the proximal end of the microphone boom 20 where it is attached to the receiver capsule. Limiting the rotation in this way prevents damage to the cable wiring that would occur if the cable 24 were wound predominantly in one direction. In the preferred embodiment, the range of cable rotation (shown by arrow B in FIG. 3C) is limited to approximately 300 degrees.

Figure 7A:
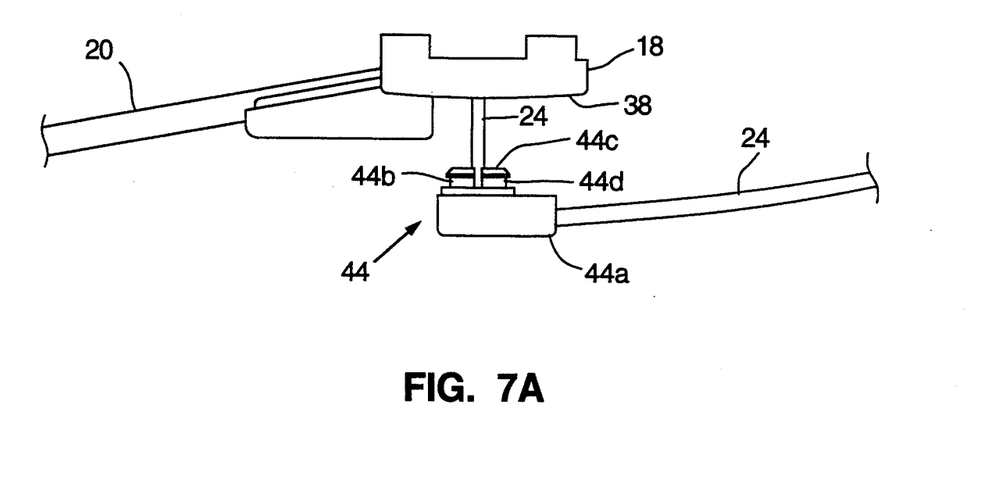
FIG. 7A is a partial, exploded, side view of the outer portion of the receiver capsule, showing details of the cable pivot joint.
Figure 7B:
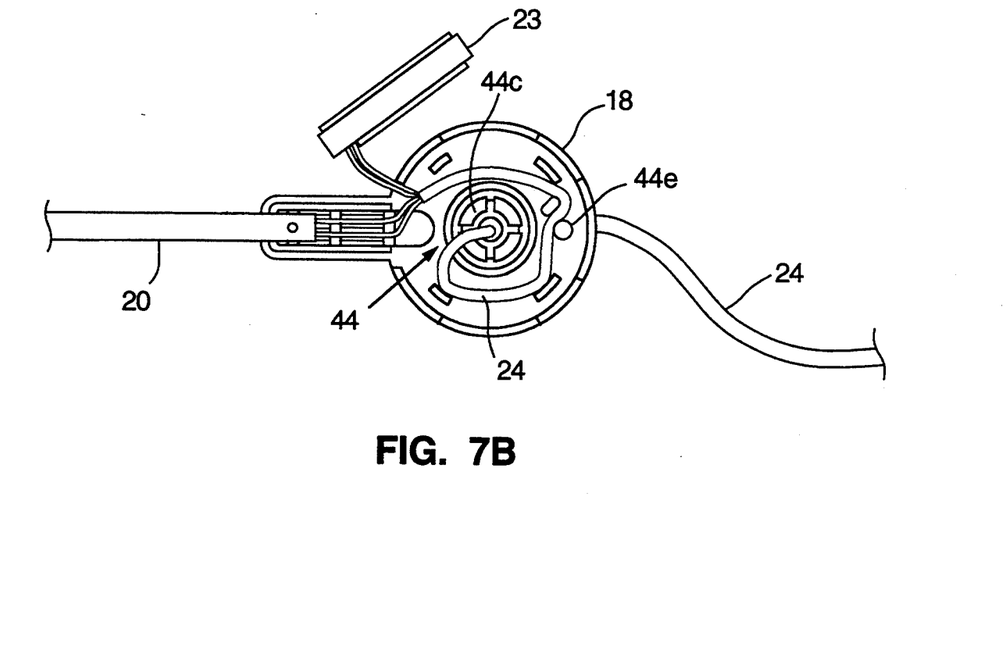
FIG. 7B is a partial plan view of the inside of the outer portion of the receiver capsule, showing details of the cable pivot joint.

FIGS. 7A and 7B show details of the cable pivot 44. Cable 24 enters cable pivot 44 through a radial end 44a, makes a right angle turn and exits the cable pivot 44 at its axial end 44b and continues into the receiver capsule 18 (only the outer half of the receiver capsule 18 is shown). Segmented flange 44c rotatable secures the cable pivot 44 onto the receiver capsule 18. Because the flange 44c is segmented and can be flexed inwardly, the axial end 44b of the cable pivot 44 can be snapped into a complementary hole (not shown) in the center of the outside shell of the receiver capsule 18 and is captivated by flange 44c. A loose fit is provided between relief 44d and the complementary hole to ensure minimal resistance to cable pivot rotation. A strain relief 44e is located inside the receiver capsule 18 to prevent cable 24 from being pulled out.

The rotatable and releasable manner in which the receiver capsule 18 is held by the capsule holder 26, in combination with the cable rotation provided by cable pivot 44 and capsule rotation provided by ball and socket joint 28, allows the inventive headset 12 to be configured by the wearer for use on either ear, as described below. In the preferred embodiment, the entire headset excluding the receiver capsule 18 is symmetrical about a vertical center plane. Also, the receiver capsule 18 is symmetrical about an axis passing through its center and through the center of ball and socket joint 28.

Figure 4:
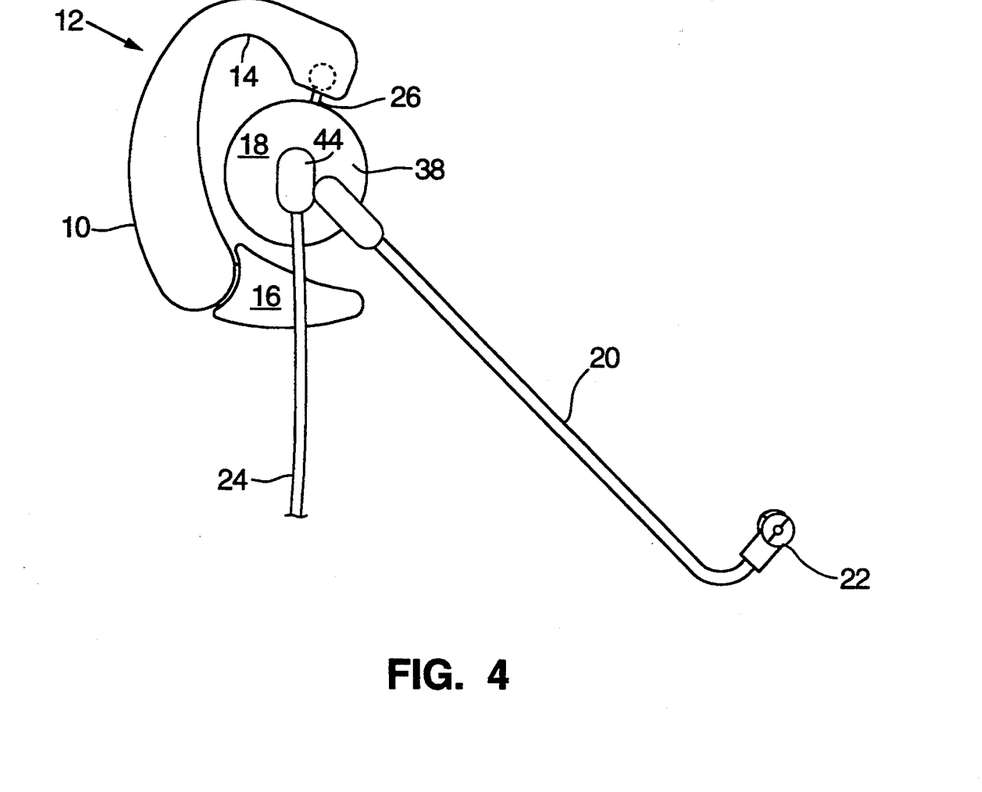
FIG. 4 is a side elevation view showing the preferred embodiment of the inventive headset configured for use on the right ear.
Figure 5:
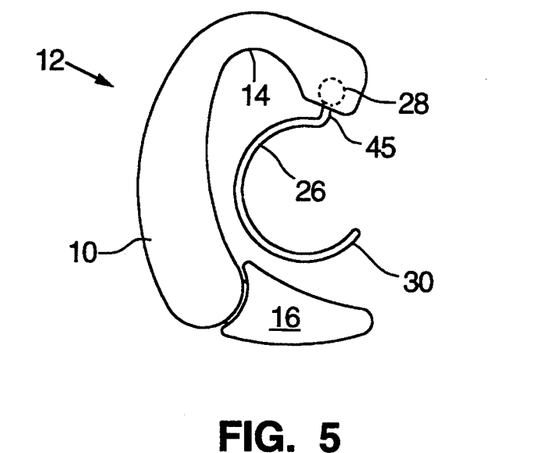
FIG. 5 is a side elevation view with the receiver capsule removed, an opposite view of FIG. 2 and a mirror image thereof.

FIG. 1 shows the headset 12 configured for use on the left ear. Headset 12 can be reconfigured for the right ear with or without removing the receiver capsule from the capsule holder 26. To reconfigure the headset 12 for use on the right ear, as shown in FIG. 4, without disengaging the receiver capsule 18, the capsule holder 26 and receiver capsule 18 are rotated about one half revolution by spinning ball joint 28 about a nearly vertical axis (an axis through the straight portion 45 of capsule holder 26.) The microphone boom 20 will then be on the opposite side of the headset 12 and extending rearward. To change the orientation of microphone boom 20 so that it is properly extending forward, the receiver capsule 18 is rotated within the capsule holder 26. Cable pivot 44 allows cable 24 to continue to extend down when the orientation of the receiver capsule 18 is changed. After these two rotations, the headset 12 is configured for use on the right ear, as shown in FIG. 4. With the headset in place on the right ear, the wearer can rotate the receiver capsule 18 within in the capsule holder 26 to adjust the microphone boom 20 to the desired orientation.

Figure 8:
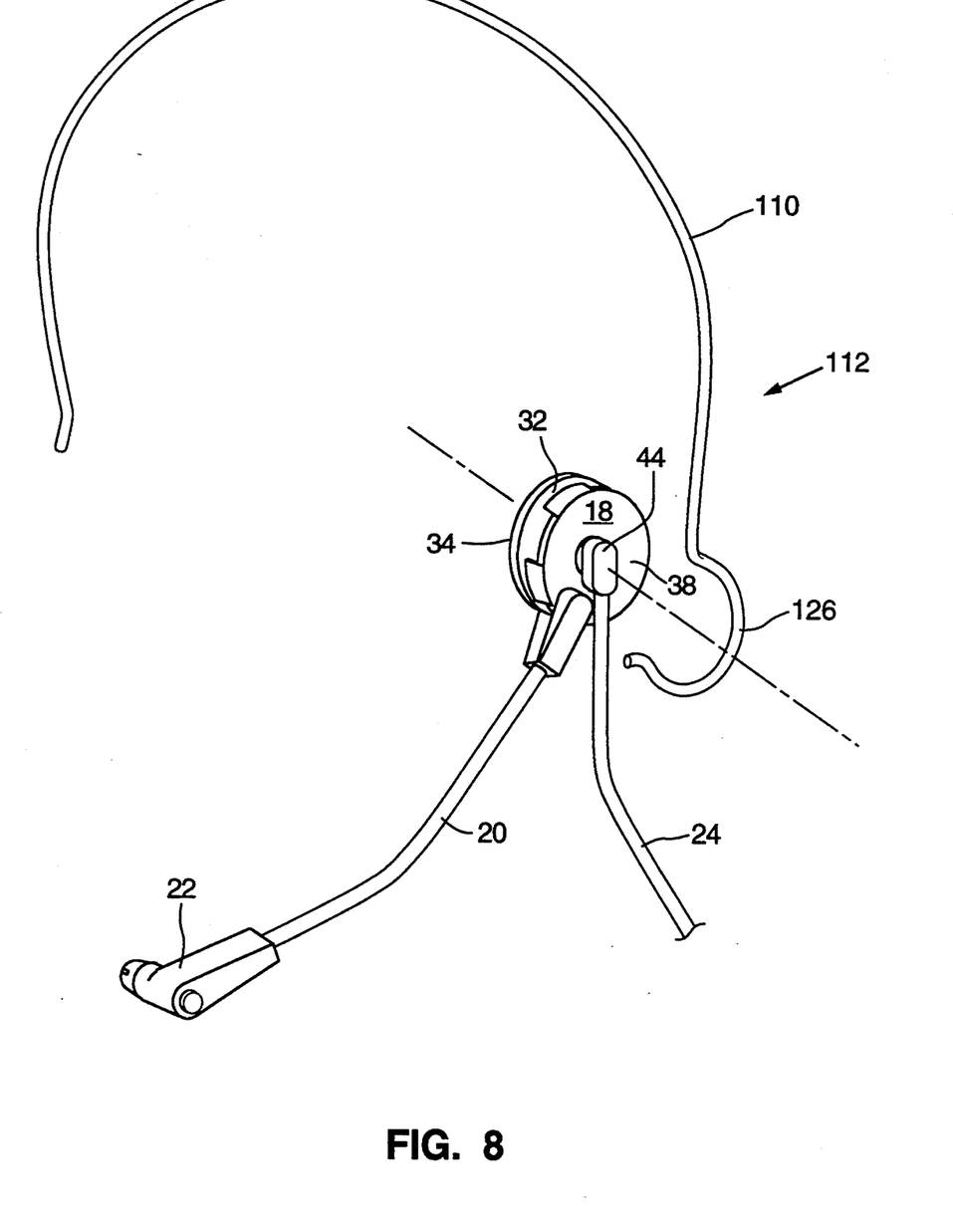
FIG. 8 is a exploded perspective view of an alternative embodiment showing the receiver capsule attached to a wire headband.

User changeability and product line uniformity is also greatly increased by the novel features of present invention. The receiver capsule 18 can be detached from a behind the ear main body 10 shown in FIG. 1, and attached to a variety of other types of headsets. For example, the receiver capsule 18 can be attached to a wire headband model, shown as 112 in FIG. 8. In this embodiment, a standard over the head, wire headband 110 is provided with a flexible capsule holder 126 at one end thereof. If the user prefers to switch to a headband support, the capsule merely has to be attached to the capsule holder 126 of wire band 110 in the manner described above with respect to the first embodiment. In this alternate embodiment, the user can change ears simply by rotating the capsule so that the boom faces in the proper direction.

Figure 9:
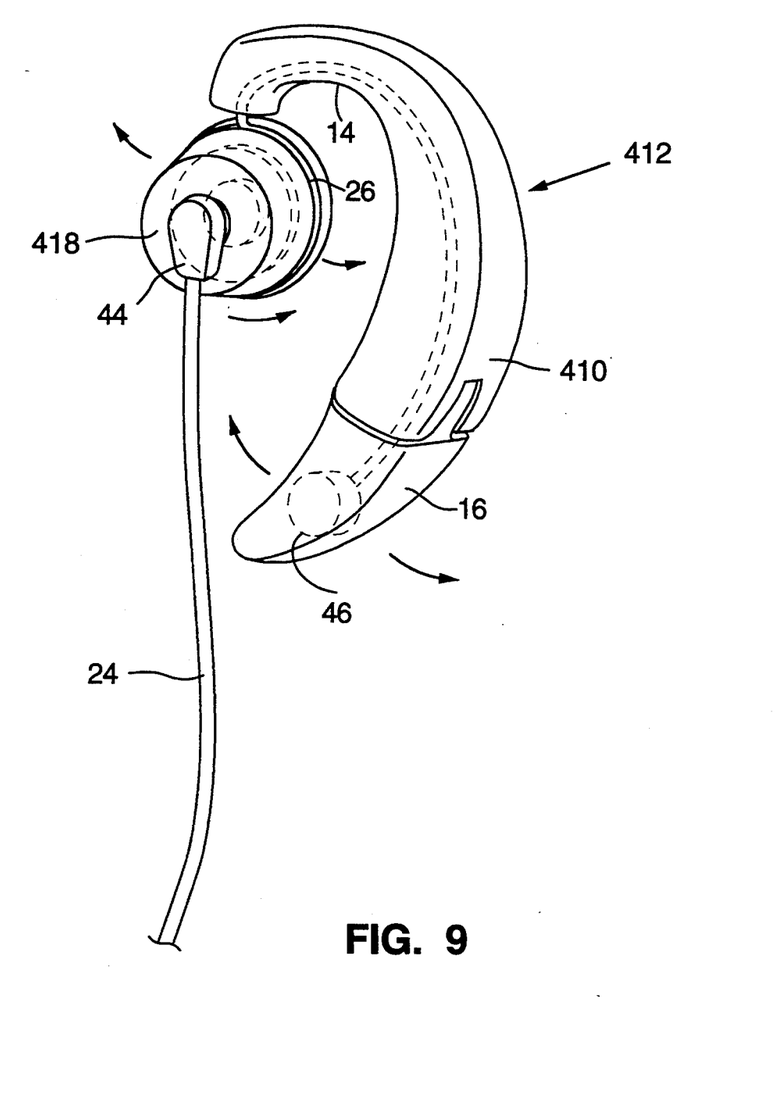
FIG. 9 is a perspective view of an alternative embodiment showing a boomless headset.
Figure 10A:
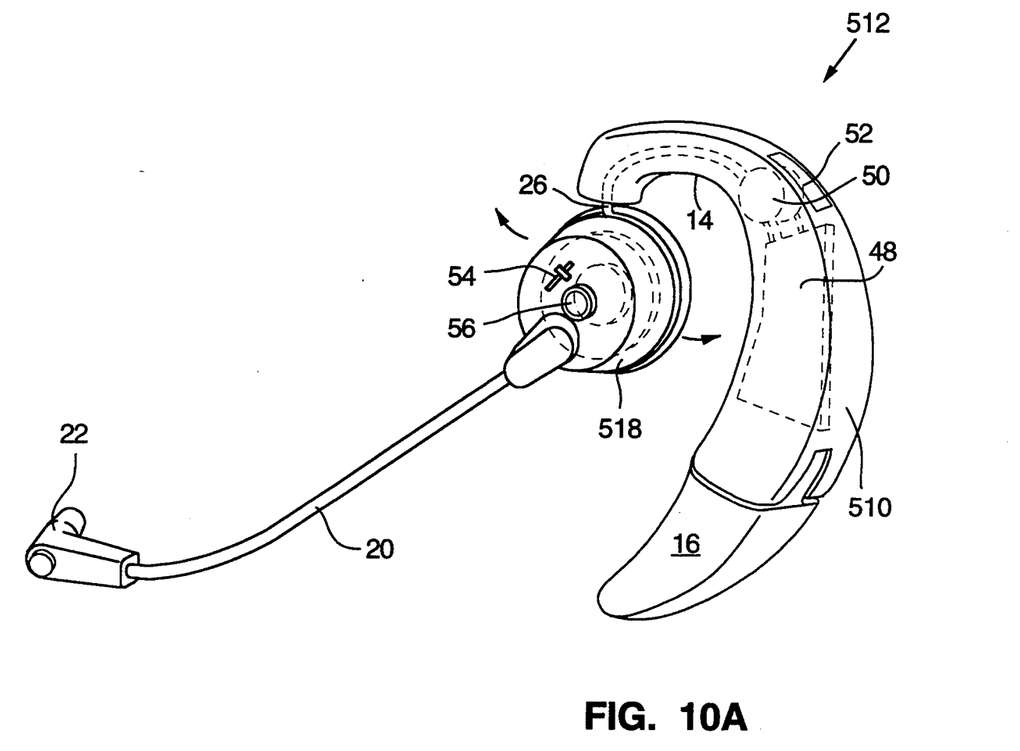
FIG. 10A is a perspective view of an alternative embodiment showing a wireless headset.
Figure 10B:
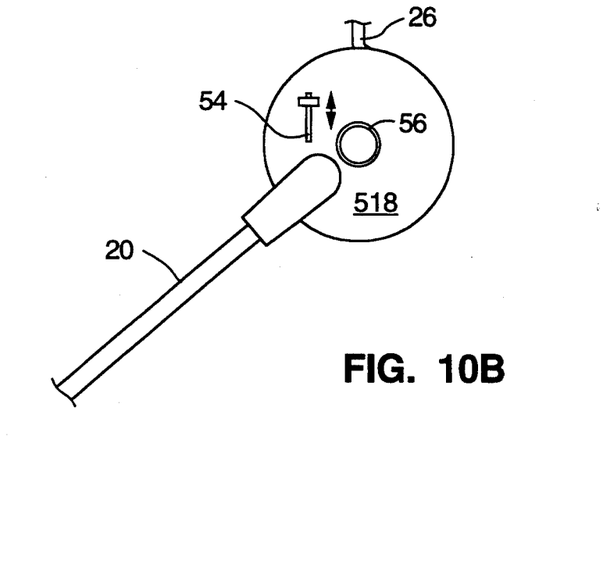
FIG. 10B is a side elevation view of the receiver capsule of FIG. 10A.
Figure 11A:
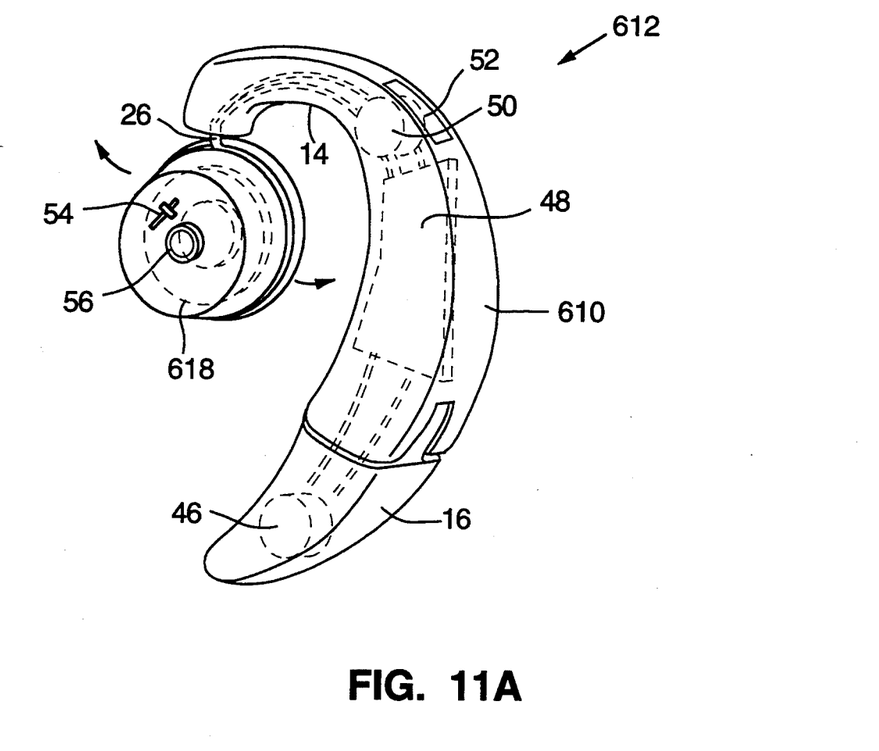
FIG. 11A is a perspective view of an alternative embodiment showing a boomless and wireless headset.
Figure 11B:
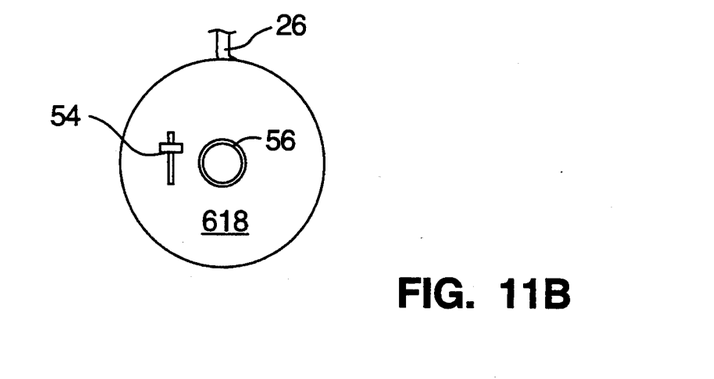
FIG. 11B is a side elevation view of the receiver capsule of FIG. 11A.

FIGS. 9 to 11 illustrate alternate embodiments which utilize the most current advances in headset technology such as mastoid microphones and cordless communication circuitry. As noted above, communication headsets are becoming ever smaller, lighter, more mobile and transparent to the wearer. The use of a removable and replaceable receiver capsule 18 lends itself to the new headset configurations that are being developed. New features can be added to the manufacturing process more easily, and customers can upgrade or change configurations simply by unsnapping one receiver capsule and swapping it with another.

FIG. 9 shows a headset 412 wherein a mastoid microphone 46 is used instead of a more traditional microphone boom. The mastoid microphone 46 is mounted in the main body 410 to pick up the wearer's voice directly from the mastoid process below and behind the user's ear. The receiver capsule 18 is replaceably mounted to capsule holder 26 in the manner described above. In this embodiment, wires running from the mastoid microphone to the cable 24 must pass from the main body to the receiver capsule. It is envisioned that this connection will be made by an external cable (not shown) bridging the main body and receiver capsule near the ball joint. A rotation stop (not shown) should be employed to keep this cable from winding around the capsule holder when the capsule holder is rotated about the ball joint. In order to make the receiver capsule detachable, a plug or disconnect device (not shown) should also be provided.

FIGS. 10A–10B show a headset 512 having a conventional microphone boom and a transceiver 48 instead of a cable to communicate with external communications equipment. An on board battery 50 powers the headset and is inserted through a battery door 52. A slide control 54 is mounted on the receiver capsule 518 to adjust the volume. An "on/off hook" push button 56 is also mounted on the receiver capsule 518. FIGS. 11A–11B show a headset 612 that is both wireless and boomless combining the advanced features of both the embodiments in FIGS. 9 and 10.

It is to be understood that the present invention is not limited to the sole embodiments described above and illustrated herein, but encompasses any and all variations falling within the scope of the appended claims.

We claim:

1. A communications headset comprising:
   main body for securing the headset in a fixed location relative to the wearer's head;
   a receiver capsule connected to the main body and located over the auditory canal of an ear of the wearer, the receiver capsule accommodating a receiver element for converting electrical signals into audible sound waves that are coupled with the auditory canal through sound port means;
   a cable for electrically connecting the headset to external communications equipment; and
   cable pivot means located on the receiver capsule and extending therefrom along a pivot axis substantially perpendicular to the plane of the ear, the pivot means being rotatable about the pivot axis, the cable extending from the pivot means in a radial direction from the pivot axis, thereby allowing the cable to remain hanging in a downward direction from the pivot means when the wearer's head is inclined forward and back.

2. A communications headset according to claim 1, wherein the cable pivot is centrally located on a side of the receiver capsule opposite the sound port means.

3. A communications headset according to claim 2, further comprising a microphone boom having a proximal end and a distal end, the distal end being located adjacent the wearer's mouth for picking up sound waves therefrom, the proximal end being attached to the side of the receiver capsule opposite the sound port means adjacent to the pivot means, thereby limiting the cable from pivoting one full revolution.

4. A communications headset according to claim 1, further comprising a microphone boom having a proximal end and a distal end, the distal end being located adjacent the wearer's mouth for picking up sound waves therefrom, the proximal end being attached to the receiver capsule, wherein the receiver capsule is detachable from the main body and can be rotated about the pivot axis before being reattached, thereby allowing the headset to be worn on either ear with the microphone boom extending forward adjacent the wearer's mouth and allowing the sound port means to face the wearer's ear.

5. A communications headset according to claim 1, wherein the main body comprises at least one member that secures the headset around the back of the ear.

6. A headset as recited in claim 1 further including a microphone boom fixedly mounted to said receiver capsule.

7. A headset as recited in claim 6, wherein said the connection between said receiver capsule and the main body includes a wire, rotatably mounted about the circumference of the receiver capsule, permitting said receiver capsule to rotate.

* * * * *